United States Patent [19]

Gilb

[11] Patent Number: 4,498,801
[45] Date of Patent: Feb. 12, 1985

[54] RIDGE RAFTER CONNECTOR

[75] Inventor: Tyrell T. Gilb, Berkeley, Calif.

[73] Assignee: Simpson Strong-Tie Company, Inc., San Leandro, Calif.

[21] Appl. No.: 422,156

[22] Filed: Sep. 23, 1982

Related U.S. Application Data

[63] Continuation of Ser. No. 223,817, Jan. 9, 1981, abandoned.

[51] Int. Cl.³ .......................... B25G 3/00; E04B 1/41
[52] U.S. Cl. .................................. 403/232.1; 403/4; 403/189; 52/715; 52/90
[58] Field of Search .................. 403/232.1, 187, 189, 403/230, 406, 3, 4, 405, 27; 52/712, 715, 639, 90

[56] References Cited

U.S. PATENT DOCUMENTS

| | | |
|---|---|---|
| 537,505 | 4/1895 | Van Dorn . |
| 666,918 | 1/1901 | Butz . |
| 1,978,642 | 10/1934 | MacLean ............................ 403/406 |
| 2,037,736 | 4/1936 | Payne et al. ........................ 403/406 |
| 3,184,800 | 5/1965 | Nelson . |
| 3,481,635 | 12/1969 | Tracy . |
| 3,596,941 | 8/1971 | Tracy . |
| 3,907,445 | 9/1975 | Wendt ............................. 403/232.1 |
| 3,989,398 | 11/1976 | Wendt . |
| 4,198,175 | 4/1980 | Knepp et al. ..................... 403/232.1 |
| 4,230,416 | 10/1980 | Gilb ................................. 403/232.1 |

OTHER PUBLICATIONS

TECO Rough Carpentry Wood Framing Systems; Jun. 1972 entitled: Structural Wood Fasteners.
Popular Mechanics Magazine, Aug. 1964, pp. 137–140, Article entitled: Engineering Nailing Simplifies Framing.

Primary Examiner—Cornelius J. Husar
Assistant Examiner—Todd G. Williams
Attorney, Agent, or Firm—James R. Cypher

[57] ABSTRACT

A ridge rafter connector formed from a strip of sheet metal which encapsulates the sides of the rafter and is normally connected to the side and top of the ridge beam. The top flange of the connector is configured so that it provides a locator function for the rafter to be connected on the opposite side of the ridge beam.

The connecting flange attached to the holding beam may be planar or bent to different angles for use at various locations and for different purposes.

3 Claims, 7 Drawing Figures

RIDGE RAFTER CONNECTOR

BACKGROUND OF THE INVENTION

This application is a continuation of application Ser. No. 06/223,817 filed Jan. 9, 1981, now abandoned.

Metal connectors for wood to wood and wood to metal building frame members have been in use at least as early as 1895. (Van Dorn, U.S. Pat. No. 537,505). In spite of the early use of connectors and the provision of specialized connectors for nearly every possible connection, no metal connector has yet come into wide general usage for connecting the common rafter to the ridge beam. The underlying problem is that the rafter joint at the ridge does not require such a product for structural reasons, so that it must be justified as a convenience or jigging item. Further, products such as the Simpson A-34 or A-35 framing anchors as set forth in the Prior Art Statement can provide reinforcement if such is desired. Moreover, the ridge board itself is not necessary structurally; providing essentially a locator function during erection.

Nelson, in U.S. Pat. No. 3,184,800 discloses two forms of rafter supports. The first form encapsulates and is connected to one rafter but is only connected to the rafter on the opposite side of the ridge board by a tongue which only attaches to the top face of the rafter. The other form, encapsulates and is connected to both rafters but it is a larger and more complicated device which cannot be used for other purposes; such as attaching lean-to-rafters to flat roof or vertical surfaces. Moreover, neither Nelson connector makes any connection to the side of the ridge beam; the connection being solely to the top of the ridge beam. The main problem with Nelson, is that it cannot be used to fully encapsulate and connect a single rafter to a ridge board and also provide a locator function for the rafter on the opposite side of the ridge beam.

Tracy U.S. Pat. Nos. 3,481,635 and 3,596,941 teach universal ridge rafter connectors which provide no connection to the side of the ridge beam nor do they teach the use of a bracket for holding a single rafter which also provides a locator function for a rafter on the opposite side of the ridge beam.

SUMMARY OF THE INVENTION

The ridge rafter of the present invention provides side encapsulation of each rafter and connection to both the top and side face of the ridge beam.

The ridge rafter described provides a locator function for the rafter on the opposite side of the ridge beam with a unique interlock structure.

The connector has a unique structural configuration so that it meets building code nail spacing and nailing holding requirements.

The connector may be job-rebent and be used to attach lean-to-rafters to flat roof or vertical surfaces.

The connector can be formed from a flat sheet metal strip with a minimum of waste metal and utilized so efficiently that the cost of the connector can be minimized.

The connector can be job-rebent and even used with rafters with 90° end cuts.

DESCRIPTION OF THE PREFERRED EMBODIMENTS

Figure 7:
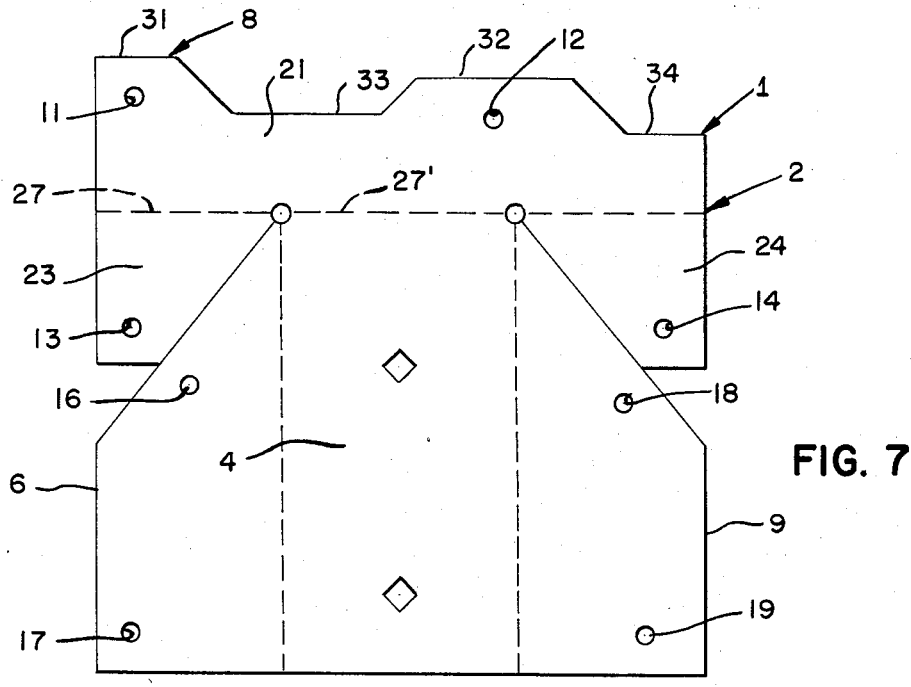
FIG. 7 is a plan view of the metal sheet from which the device is constructed showing the cut and bend lines.

The rafter connector 1 is formed from a sheet metal blank as shown in FIG. 7. The connector consists of flange member 2 adapted for connection to a holding member 3 such as a wood ridge beam. A back portion 4 is connected to the flange member. A side member 6 is connected to the back portion and is adapted for connection to a held member 7 such as a wood rafter member. Locator means 8 is formed in the flange member and is adapted for engagement with a locator means in a matching rafter connector 1' holding a second held member 7' such as a wood rafter.

Preferably, the connector is formed with a second side member 9 connected to the back portion and adapted for connection to the held member 7.

In order to facilitate connection, the flange member 2 is formed with fastener openings 11 through 14. Preferably the side member 6 is formed with fastener openings 16 and 17 and side member 9 is formed with openings 18 and 19.

When the connector is used with a ridge beam, the flange member 2 includes a top portion 21 adapted for connection to a top face 22 of the ridge member 3 and lower portions 23 and 24 adapted for connection to a side face 26 of the holding member. The flange member 2 is preferably formed with a straight line bend line 27 connecting the top and lower portions which intersects the edges only of the back portion and side members so as to permit the flange to be bent at an infinite number of angles from a planar condition.

Figure 1:
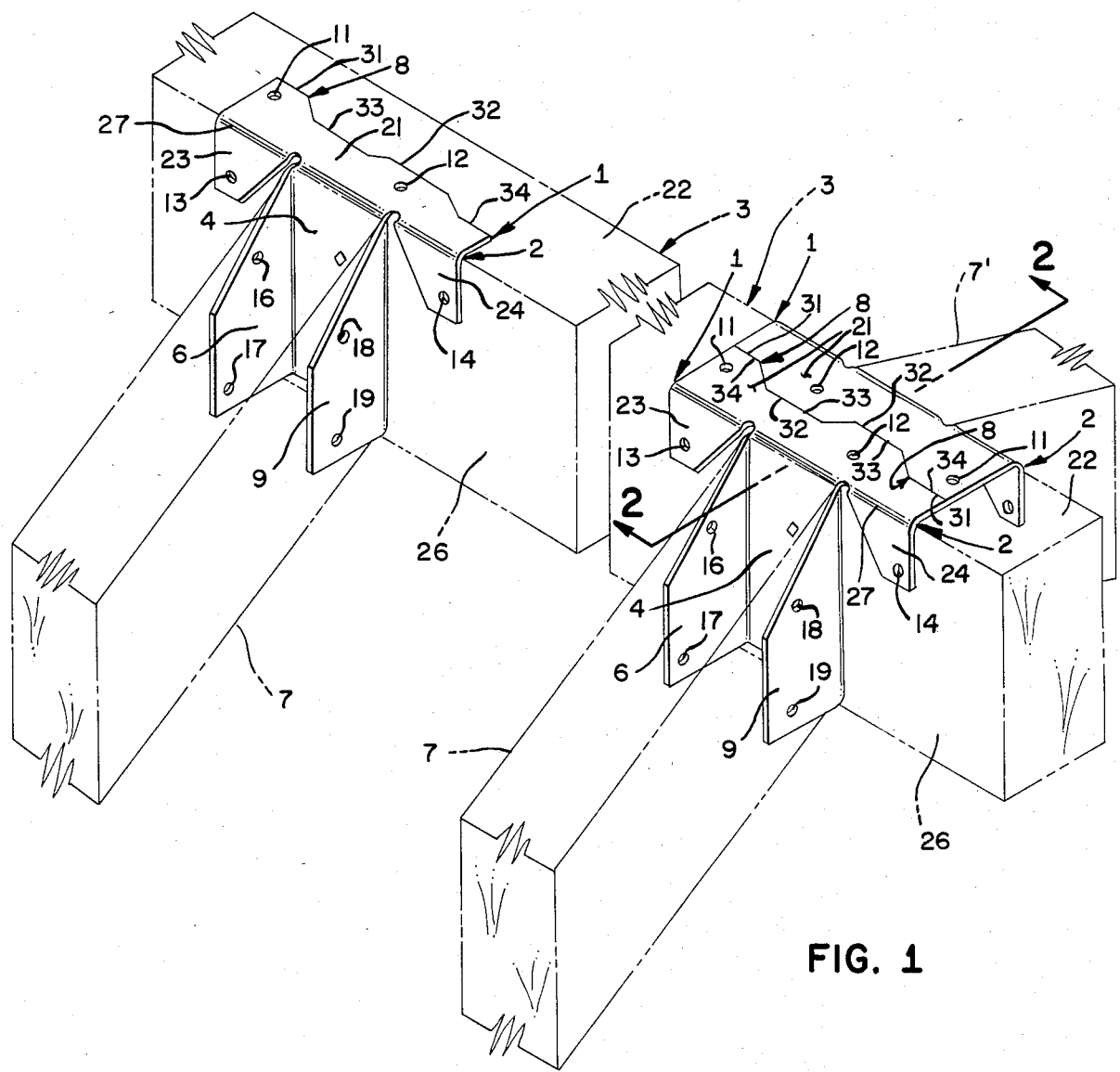
FIG. 1 is a perspective view of three rafter connectors of the present invention installed on a ridge beam. A single connector attaching a single rafter is shown and also two connectors attaching a pair of rafters illustrating the rafter locator function.
Figure 2:
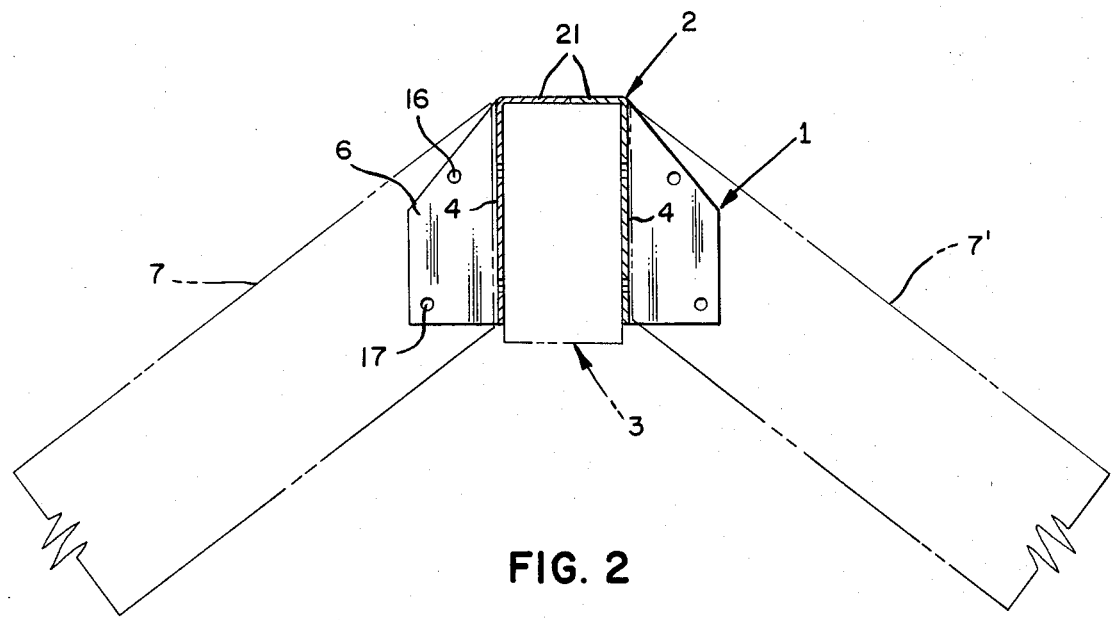
FIG. 2 is a cross sectional view taken along line 2—2 of FIG. 1.
Figure 3:
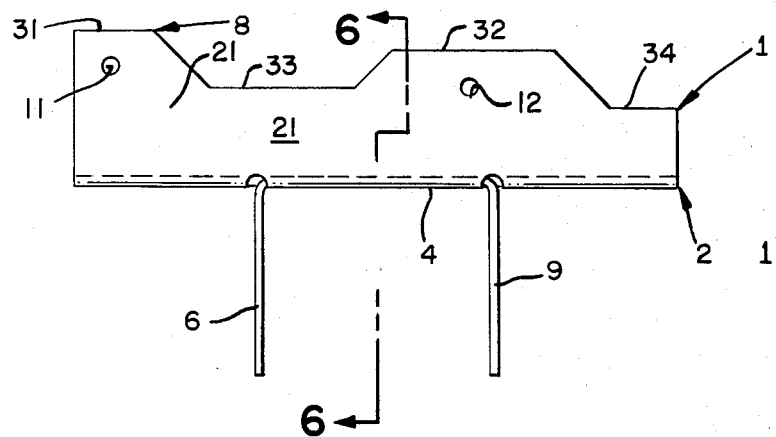
FIG. 3 is a top plan view of the device shown in FIG. 1.
Figure 6:
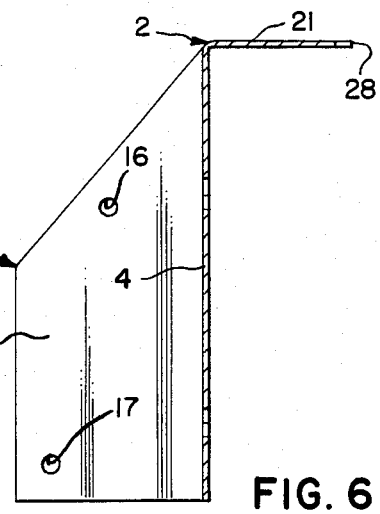
FIG. 6 is a cross sectional view taken along line 6—6 of FIG. 3.
Figure 4:
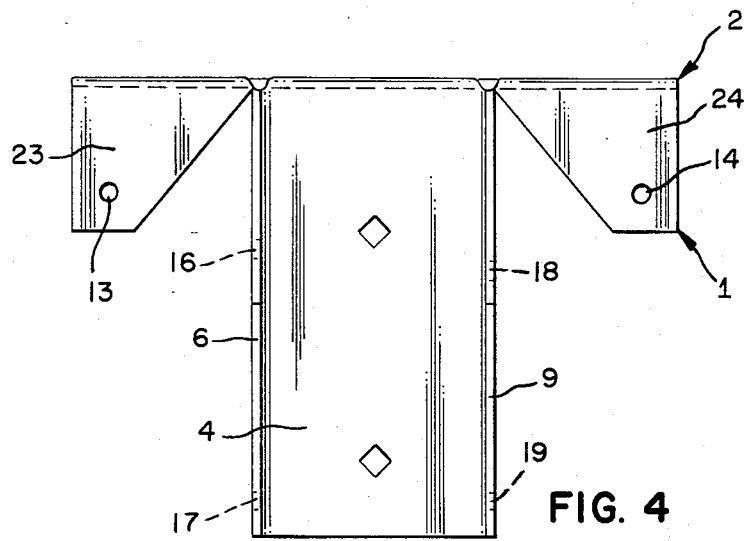
FIG. 4 is a side view of the device shown in FIG. 1.
Figure 5:
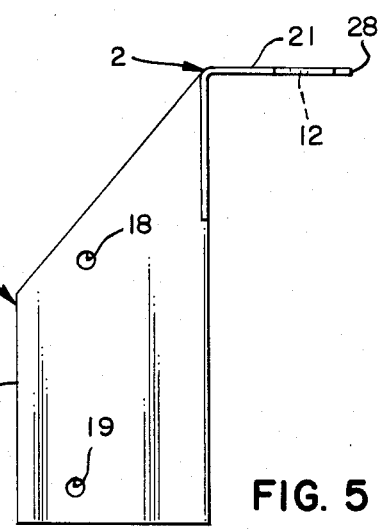
FIG. 5 is an end view of the device of FIG. 1.

The locator means 8 includes an irregular edge pattern in the edge 28 (See FIGS. 5 and 6) of the flange member 2. As shown in FIGS. 1, 3 and 7, the irregular edge pattern in the edge of the flange includes a plurality of protruding portions 31 and 32 and a plurality of indent portions 33 and 34. Fastener openings 11 and 12 are formed in the protruding portions.

As shown in FIG. 1 when two rafter connectors are installed, protruding portions 31 and 32 of one connector interlock with the indent portions 33 and 34 of the other connector. Thus, rafter 7 is in alignment with rafter 7'. By flattening the top flange member 2 so that the top portion 21 and the lower portions 23 and 24 are in the same plane, the connector may be attached to a rafter and to the face only of a ridge board or ledger.

The rafter connector may be used with any rafter slope and any 2 in. or more nominal rafter width.

The connector of the present invention correctly spaces the nails in the top portion of the flange so that the nails are the proper distance from the edge of the ridge member and from each other. Furthermore, even when two rafter connectors are placed in interlocked relation as shown in FIG. 1, code nail spacing in both of the top flange portions of each connector is still maintained.

The ridge rafter connector of the present invention may also be used to attach a 90° cut rafter edge to a ridge beam. This may be accomplished by flattening the flange member 2 and attaching the flange below the top edge of the ridge member. The bend line portion 27' bordering the back portion 4 is then bent at an angle parallel to the slope of the rafter that it is holding.

This latter use of the connector illustrates the fact that by strategically placing the bend line 27, the device may have many different uses. Thus the bend line 27 which intersects top flange portion 21 and lower flange portion 23 may be bent at an angle which is different from the bend 21' which is adjacent the back portion 4.

I claim:

1. In combination, a ridge board, a pair of rafters located on opposite sides of said ridge board, said rafters being secured to said ridge board by a pair of matching rafter connector adapted to secure said rafters to said ridge board, and to locate and maintain said rafters in axial alignment to each other; said connectors each comprising:
   a. a flange member having a top portion adapted for connection to a top face of said ridge board and lower portions adapted for connection to a side face of said ridge board;
   b. a back portion connected to said flange member and adapted for registration with said side face of said ridge board;
   c. a side member connected to said back portion and adapted for connection to said rafter;
   d. said flange member is formed with fastener openings for receiving fasteners therethrough for attachment of said connector to said rafter, and said top portion and said lower portion of said flange member are formed with fastener openings for receiving fasteners therethrough for attachment of said connector to said top face and said side face respectively of said ridge board;
   e. said flange member is formed with a straight line bend line connecting said top and lower portions which intersect the edge only of said back portion and said side members so as to permit said flange to be bent at an infinite number of angles from a planar condition;
   f. said top portion of said flange member is formed with a distal edge having an irregular edge pattern forming a plurality of protruding portions and a plurality of indent portions with a fastener opening in at least one of said protruding portions; and
   g. said protruding and indent portions in said irregular edge of said flange are located so as to interfit with said protruding and indent portions in said irregular edge of said flange of said matching rafter connector when installed on opposite sides of said ridge board.

2. The combination of claim 1 in which said connector includes a second side member connected to said back portion and is adapted for connection to the opposite side of said rafter.

3. The combination of claim 1 in which each of said protruding portions of said flange of each of said connectors is formed with a fastener opening and said fastener openings are located so that code approval nail spacing is maintained.

* * * * *